United States Patent
Sylvain

(10) Patent No.: US 6,819,678 B2
(45) Date of Patent: Nov. 16, 2004

(54) INTERWORKING OF DISSIMILAR PACKET NETWORKS FOR TELEPHONY COMMUNICATIONS

(75) Inventor: Dany D. Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 743 days.

(21) Appl. No.: 09/741,041

(22) Filed: Dec. 21, 2000

(65) Prior Publication Data

US 2002/0080791 A1 Jun. 27, 2002

(51) Int. Cl.[7] .................................................. H04J 3/16
(52) U.S. Cl. ...................... 370/466; 370/401; 370/395.5
(58) Field of Search ................................ 370/465–466, 370/469, 470, 395.1–395.65, 401–406

(56) References Cited

U.S. PATENT DOCUMENTS

| | | | |
|---|---|---|---|
| 5,712,903 A | | 1/1998 | Bartholomew et al. ....... 379/89 |
| 5,802,287 A | | 9/1998 | Rostoker et al. ......... 395/200.8 |
| 6,072,794 A | * | 6/2000 | Kang .......................... 370/352 |
| 6,108,336 A | * | 8/2000 | Duault et al. ............. 370/395.6 |
| 6,111,893 A | | 8/2000 | Volftsun et al. ............. 370/466 |
| 6,151,390 A | * | 11/2000 | Volftsun et al. ............. 379/229 |
| 6,278,697 B1 | * | 8/2001 | Brody et al. ................. 370/310 |
| 6,304,574 B1 | * | 10/2001 | Schoo et al. ................. 370/401 |
| 6,480,511 B1 | * | 11/2002 | Petty .......................... 370/509 |
| 6,519,261 B1 | * | 2/2003 | Brueckheimer et al. ............................................. 370/395.52 |
| 6,556,573 B1 | * | 4/2003 | Kaaresoja ............... 370/395.64 |
| 6,560,225 B1 | * | 5/2003 | Czajkowski et al. ........ 370/356 |
| 6,563,816 B1 | * | 5/2003 | Nodoushani et al. ....... 370/352 |
| 6,590,909 B1 | * | 7/2003 | Stacey et al. ............... 370/537 |
| 6,603,757 B1 | * | 8/2003 | Locascio ..................... 370/352 |
| 6,608,822 B1 | * | 8/2003 | Brent .......................... 370/329 |

FOREIGN PATENT DOCUMENTS

| | | | |
|---|---|---|---|
| EP | 0 981 234 A | 2/2000 | ............ H04M/3/42 |
| WO | PCT/US01/14215 | 5/2001 | ........... H04B/7/185 |

OTHER PUBLICATIONS

European Search Report—EP 01 31 0660.
Huitema C. et al: "An Architecture for Residential Internet Telephony Service" IEEE Network, IEEE Inc. New York, U.S.—vol. 13, No. 3, May 1999, pp. 50–56, XP000870631—ISSN: 0890–8044.
Shu J.C. et al: "An Approach to Indirect Protocol Conversion" Computer Networks and ISDN Systems, North Holland Publishing, Amsterdam, NL.—vol. 21, No. 2, Apr. 1, 1991 pp. 93–108, XP000172494—ISSN: 0169–7552.

\* cited by examiner

*Primary Examiner*—Douglas Olms
*Assistant Examiner*—Van Kim T. Nguyen
(74) *Attorney, Agent, or Firm*—Max R. Wood; Ogilvy Renault

(57) ABSTRACT

An Interworking Gateway enabled to provide continuous conversion of Protocol Data Units (PDUs) of any one of a provisioned set of transport protocols to any other member of the set is disclosed. Each transport protocol is associated with at least one transport protocol unit comprising at least one signaling port, at least one receive path, and at least one transmit path. Receive paths are adapted to convert PDUs of respective transport protocols into a base format, and transmit paths are adapted to convert a stream of base format data into PDUs of respective transport protocols. Transport protocol units are autonomous modules. The Interworking Gateway permits telephone services to extend across different broadband telephony networks in today's telecommunications system of networks.

18 Claims, 5 Drawing Sheets

INTERWORKING OF DISSIMILAR PACKET NETWORKS FOR TELEPHONY COMMUNICATIONS

CROSS-REFERENCE TO RELATED APPLICATIONS

This is the first application filed for the present invention.

MICROFICHE APPENDIX

Not applicable.

TECHNICAL FIELD

The present invention relates to voice communications systems, and, in particular, to a method and apparatus for enabling the interworking of broadband networks that use dissimilar protocols to provide telephony services.

BACKGROUND OF THE INVENTION

Modem telecommunications systems have evolved with and around the Public Switched Telephone Network (PSTN) and the Common Channel Signaling (CCS) network. Although the PSTN is an integrated, highly reliable network that is well adapted for voice service, it is expensive to construct and maintain. Furthermore, the bandwidth capacity of the circuit-switched PSTN is limited to 64 kb/s per circuit and any unused capacity of a circuit cannot be shared. The steady increase in demand for telecommunications services has taxed resources in the PSTN. Consequently, packet networks, which offer higher bandwidth capacity and resource sharing have been adapted for use in supplementing the PSTN. Recent telecommunications system configurations have incorporated Asynchronous Transfer Mode (ATM) and/or Internet Protocol (IP) networks for payload transport, with interfaces to the circuit-switched PSTN. ATM and IP networks that perform payload transport are referred to as broadband transport networks.

As the use of broadband transport networks has increased to satisfy the demand for telecommunications services, so has the number of interfaces to the PSTN. Each transport network has an associated set of transport protocols that govern the format of data units transferred through the network. Generally, a protocol data unit (PDU) for one transport protocol cannot be transferred through a transport or telephone network that uses a different transport protocol. For this reason, edge-connecting two or more broadband transport networks, and expanding addressing capabilities of respective network elements, does not necessarily enable the interworking of the two or more networks. Two networks are said to interwork when the content of PDUs of one of the two networks can be forwarded through the other of the two networks, and vice versa, and can be processed by edge equipment. Generally, an interface is provided between the two networks that performs a protocol conversion without loosing or corrupting payload data. Several such interfaces have been developed to permit the interworking of the PSTN with various broadband networks. Examples of such devices are described in Applicant's co-pending U.S. patent application Ser. Nos. 09/158,855 which was filed on Sep. 23, 1998 and is entitled TRANSIT TRUNK SUBNETWORK; and, 09/213,769 which was filed on Dec. 17, 1998 and is entitled METHOD AND APPARATUS FOR COMPLETING TELEPHONE CALLS BETWEEN SUBNETS.

Since interfaces to the PSTN exist for some broadband transport networks, it is common to provide interworking between incompatible broadband networks by routing through the PSTN. Consequently, each of the broadband transport networks interwork with the CCS network to convey call control messaging, and each is edge connected to the PSTN. However, using the PSTN as a bridge between broadband transport networks is inefficient as each conversion back and forth from packet to PSTN results in additional transmission delays and requires more equipment.

Accordingly, a method and apparatus that enables the direct interworking of different broadband transport networks for the provision of telephone services remains highly desirable.

SUMMARY OF THE INVENTION

An object of the present invention is to provide a method and apparatus for direct interworking of broadband transport networks.

Accordingly, the invention provides an apparatus for inter-working among broadband transport networks that employ dissimilar transport protocols. The apparatus comprises an Interworking Gateway (IWG). The IWG provides adaptation from any one to any other of a provisioned set of transport protocols, in response to control messaging, and signaling associated with respective networks. This interface between the broadband transport networks permits direct interworking between the broadband transport networks.

Independence of transport protocol adapters of an IWG is assured by the use of the base signal format in the design of the IWG. The IWG is comprised of a set of bi-directional interfaces, ports for example, to respective broadband networks. Each bi-directional interface is connected to at least one receive path and at least one transmit path. The receive path converts incoming PDUs (from the connected interface) into the base signal format. Each transmit path converts base signal format data into PDUs conforming to the transport protocol associated with its interface. A set of connected receive paths, transmit paths and one or more bi-directional interfaces may therefore be removed, inserted or modified independently from the other connected sets in the IWG without affecting the functioning of any of the other connected sets in the IWG. The IWG comprises a switch that connects/disconnects transmit paths to/from receive paths, and a controller of the switch and other components of the IWG. The switch controller of the IWG is adapted to exchange signaling with Call Servers of each of the broadband networks to which it has an interface.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method and apparatus for enabling and facilitating the interworking of broadband transport networks used for the provision of telecommunications services.

Figure 1:
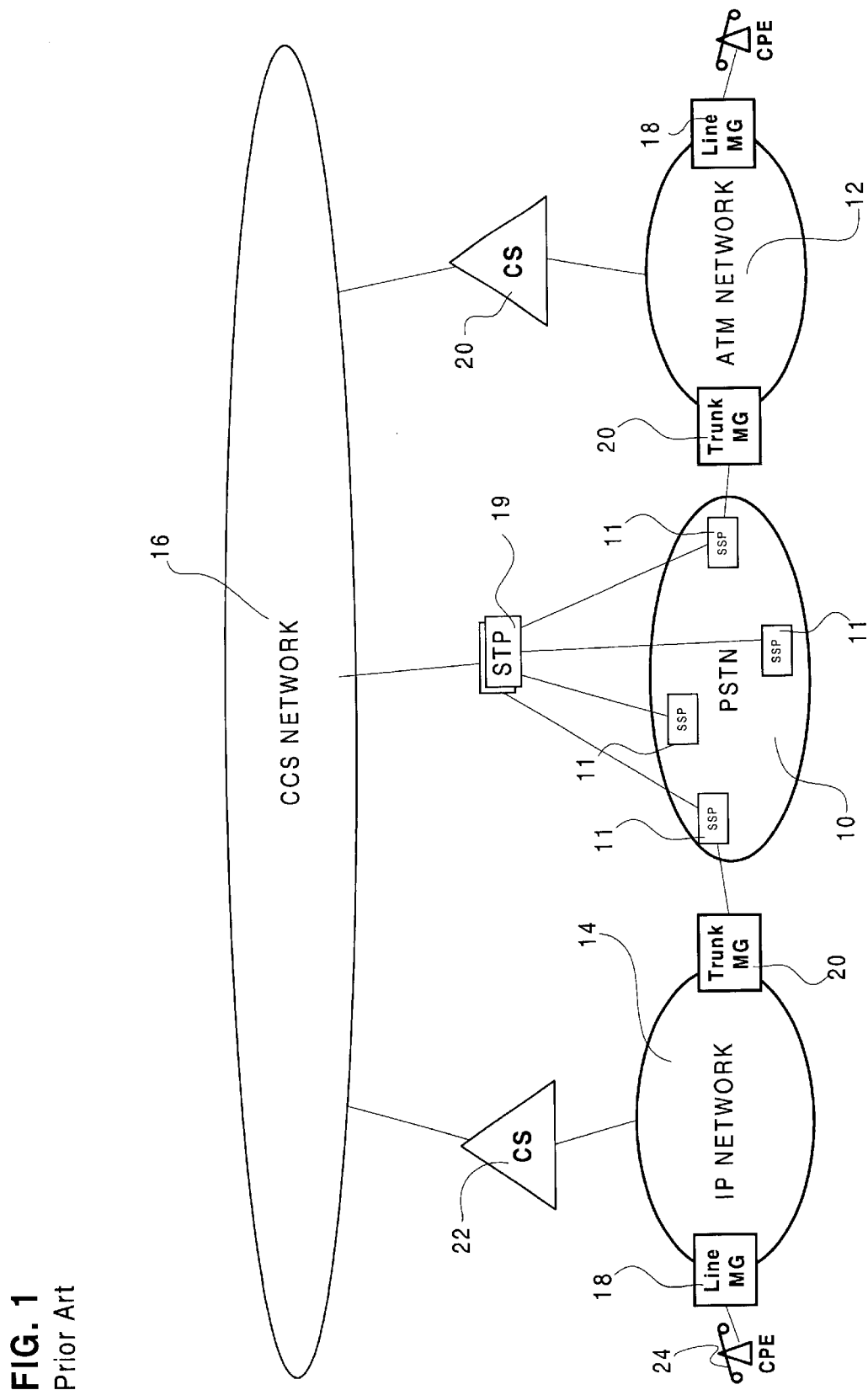
FIG. 1 is a schematic diagram representing relevant elements of a state of the art telecommunications system, showing a prior art method of interconnecting incompatible broadband networks.

FIG. 1 is a schematic diagram of a prior art telecommunications system in which two broadband networks are interfaced by the Public Switched Telephone Network (PSTN) 10. An Asynchronous Transfer Mode (ATM) network 12 is interfaced with the PSTN 10, and an Internet Protocol (IP) 14 packet network is also interfaced with the PSTN 10. The broadband transport networks 12, 14, transport telephony data in respective protocol data units (PDUs). The CCS network 16 is responsible for call control messaging between Call Servers 22 associated with the respective broadband networks, and Signal Transfer Points (STPs) 17 that transfer call control messages between Service Switching Points (SSPs) 11 of the PSTN 10. Line Media Gateways (MGs) 18 directly support subscriber lines served by their respective broadband transport networks 12, 14. Trunk MGs 20 provide interfaces between respective broadband transport networks and selected SSPs 11 of the PSTN 10. The trunk MGs 20 convert payload data from the Time Division Multiplexed (TDM) Pulse Code Modulated (PCM) payload format of the PSTN to the transport protocol of a Trunk MG's 20 respective broadband network.

Figure 2:
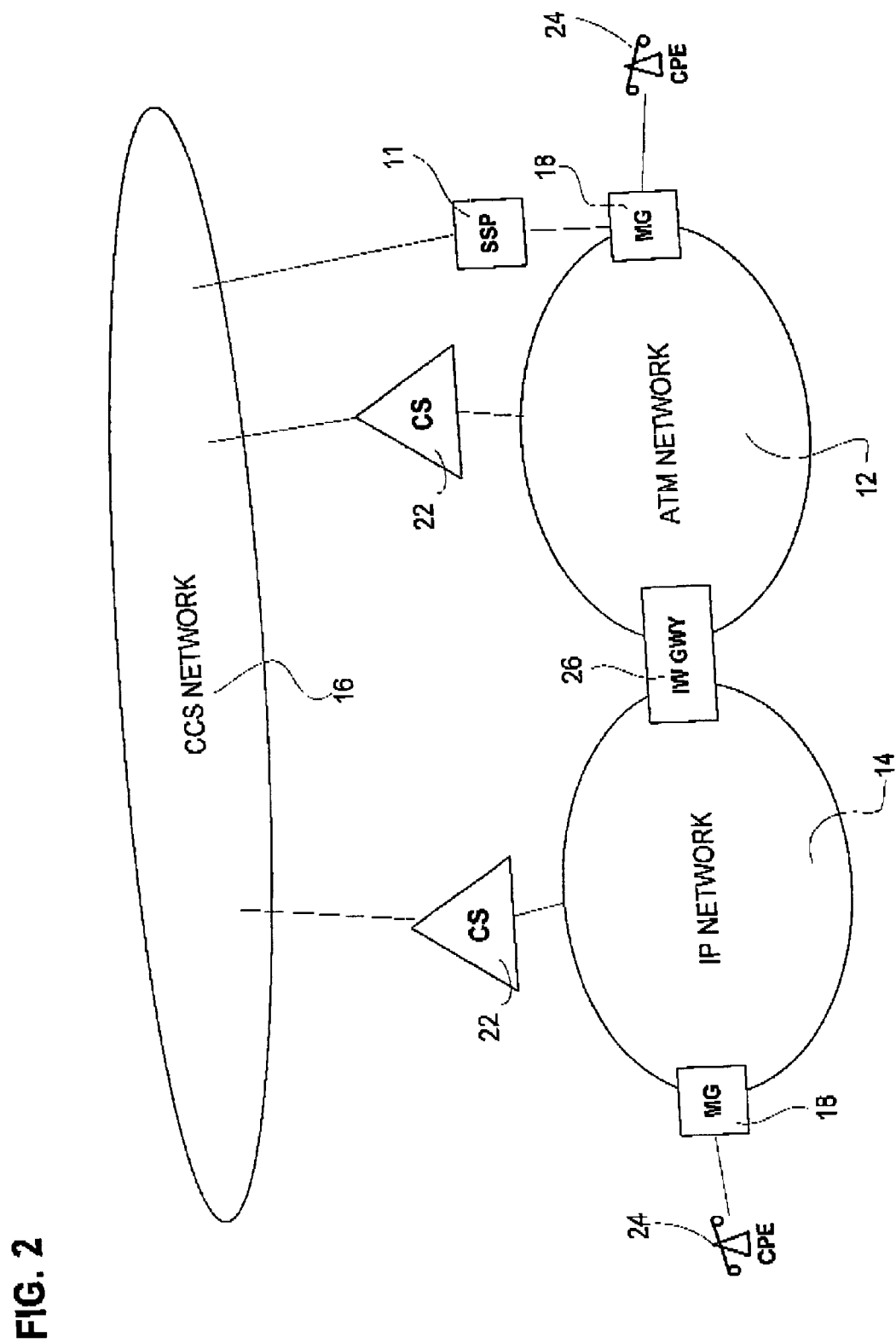
FIG. 2 is a schematic diagram of broadband transport networks configured with an Interworking Gateway (IWG) in accordance with an embodiment of the invention.

FIG. 2 illustrates an embodiment of the present invention. An Interworking Gateway (IWG) 26 is used to enable direct interworking between the IP network 14 and the ATM network 12. Control messages from other network elements for the IWG 26 are transferred through each broadband transport network to which the IWG 26 is connected. The control messages may be, for example, in H.248 messaging format. H.248 is a standard transport control protocol, which is known to persons skilled in the art.

Figure 3:
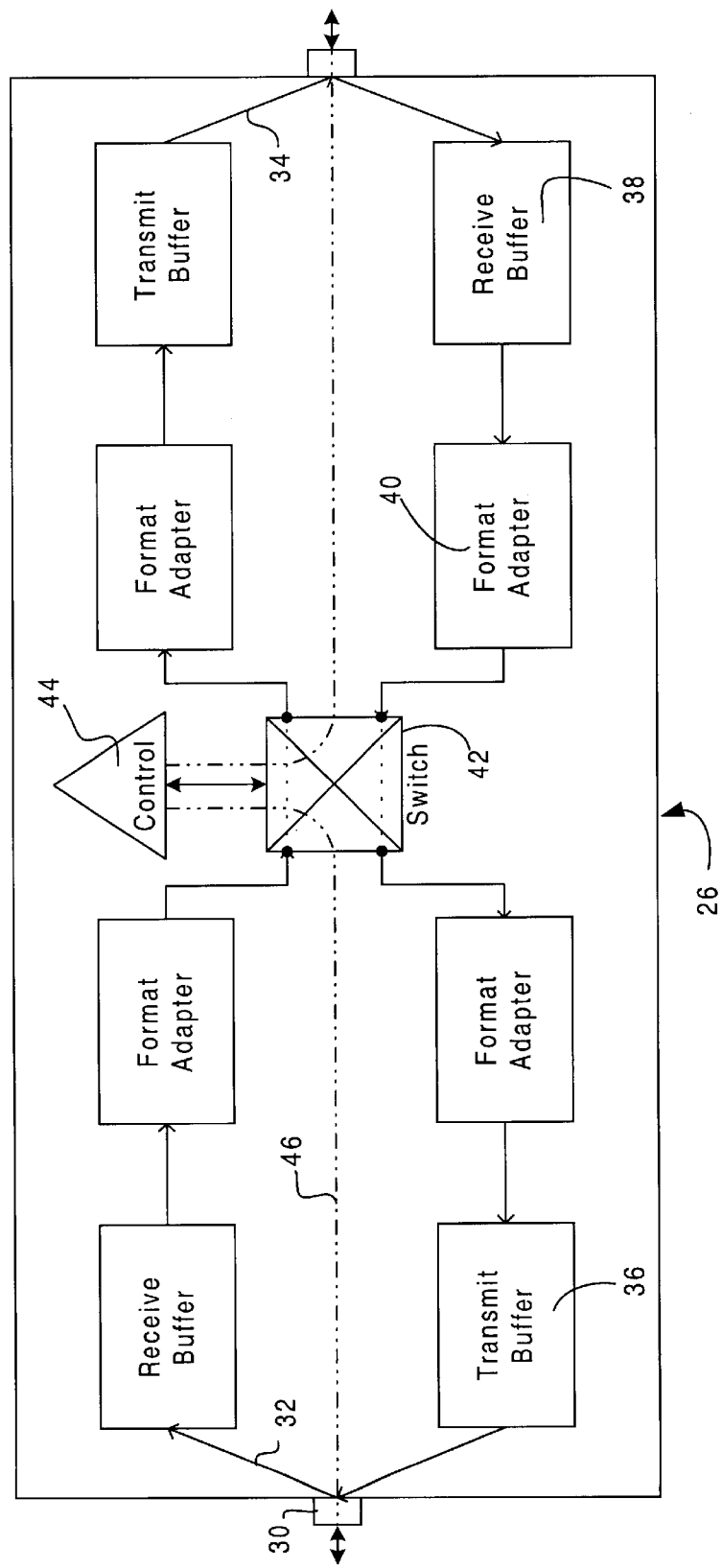
FIG. 3 is a schematic diagram illustrating an embodiment of the Interworking Gateway shown in FIG. 2.

FIG. 3 is a schematic diagram illustrating components of an IWG 26 and their inter-relationship. The IWG is connected to each of the networks it services by at least one port 30. Each of the ports 30 are connected to bi-directional transport links in the respective broadband networks 12, 14 (FIG. 2). Each port 30 is connected to two paths within the IWG 26, a receive path 32 and a transmit path 34. Each receive path 32 includes a receive buffer 38, which stores incoming protocol data units (PDUs). Likewise, each transmit path 34 includes a transmit buffer 36, which stores PDUs to be transmitted. Format adapters 40 in receive paths 32 convert PDUs from the transport protocol associated with the receive path's port 30, into a stream of data in a base format, such as pulse code moduled (PCM) data, for example. Format adapters 40 in transmit paths 34 convert data from the base format into PDUs conforming to a transport protocol associated with the transmit path's port 30. A switch 42 is controlled by a controller 44 to connect receive paths of one port to transmit paths of another port. The controller 44 has one or more dedicated signaling channels 46 that connects the controller 44 to call servers or other network elements in each of the networks it services, in a manner well known in the art. The signaling channels 46 are shunted through IWG ports 30 directly to the controller 44 of the IWG 26.

As is well understood by those skilled in the art, the format adapters 40 are complex circuits that are adapted to remove payload data from PDUs (data packets or data cells) and convert the payload data into the base format. This involves stripping header information from the PDUs. The header information is not necessarily discarded, however. Header information may be passed through the switch 42 in a selected format to a corresponding format adapter that uses the header information to construct new PDUs in the corresponding transport protocol. In addition to header manipulations, the voice data may need to be adapted to the base format. The PDUs may use any number of voice encoding schemes like ITU G.711, G.726, G.729 which get processed by the format adapter and converted to the base format. In the transmit direction, the data in the base format is converted to a format compatible with equipment supported by the corresponding broadband network, and the PDUs are passed to the transmit buffer 36.

Figure 4A:
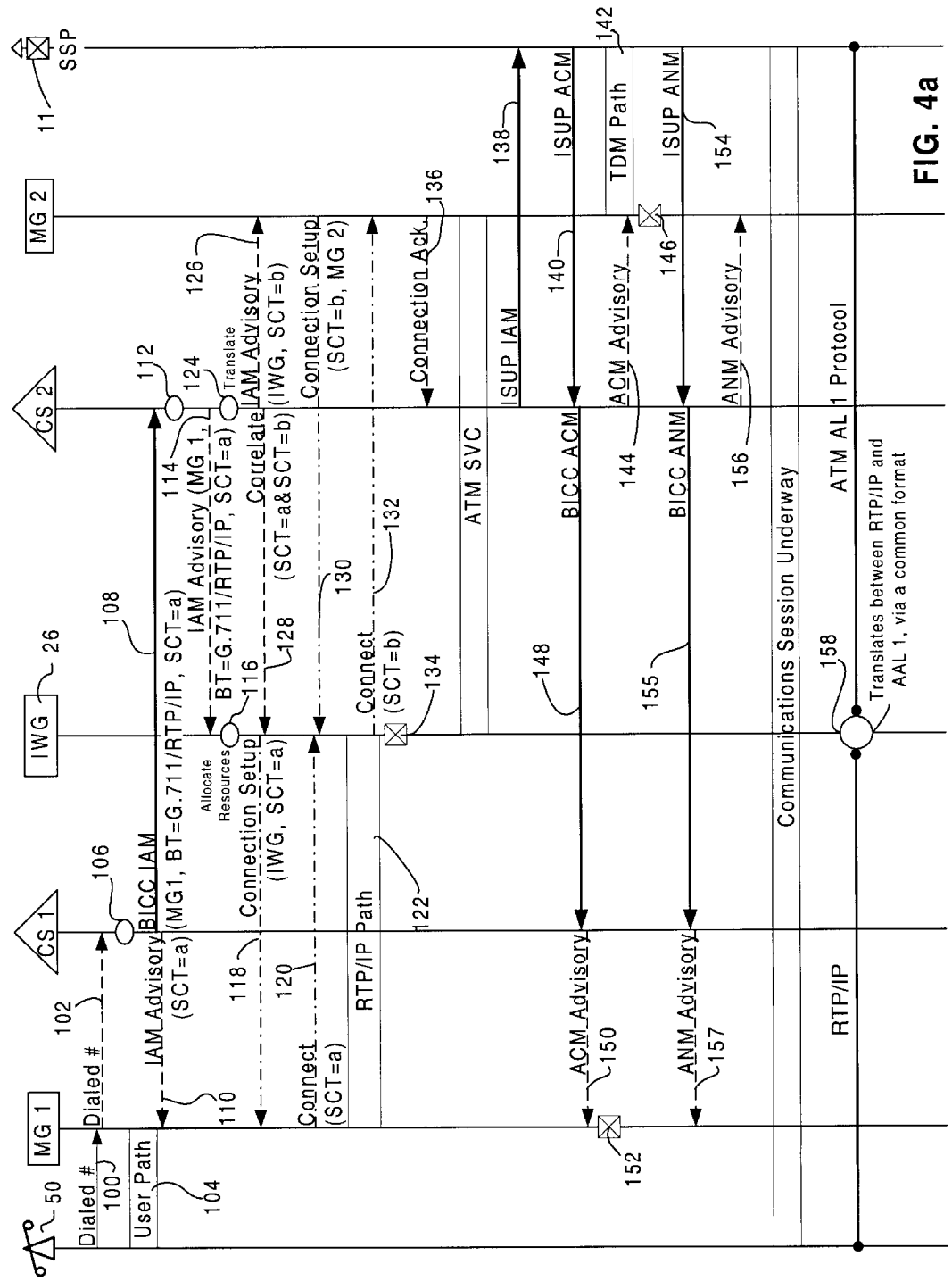
FIG. 4a is a message flow diagram of the principal messages exchanged during the setup of a communications session in accordance with an embodiment of the invention.
Figure 4B:
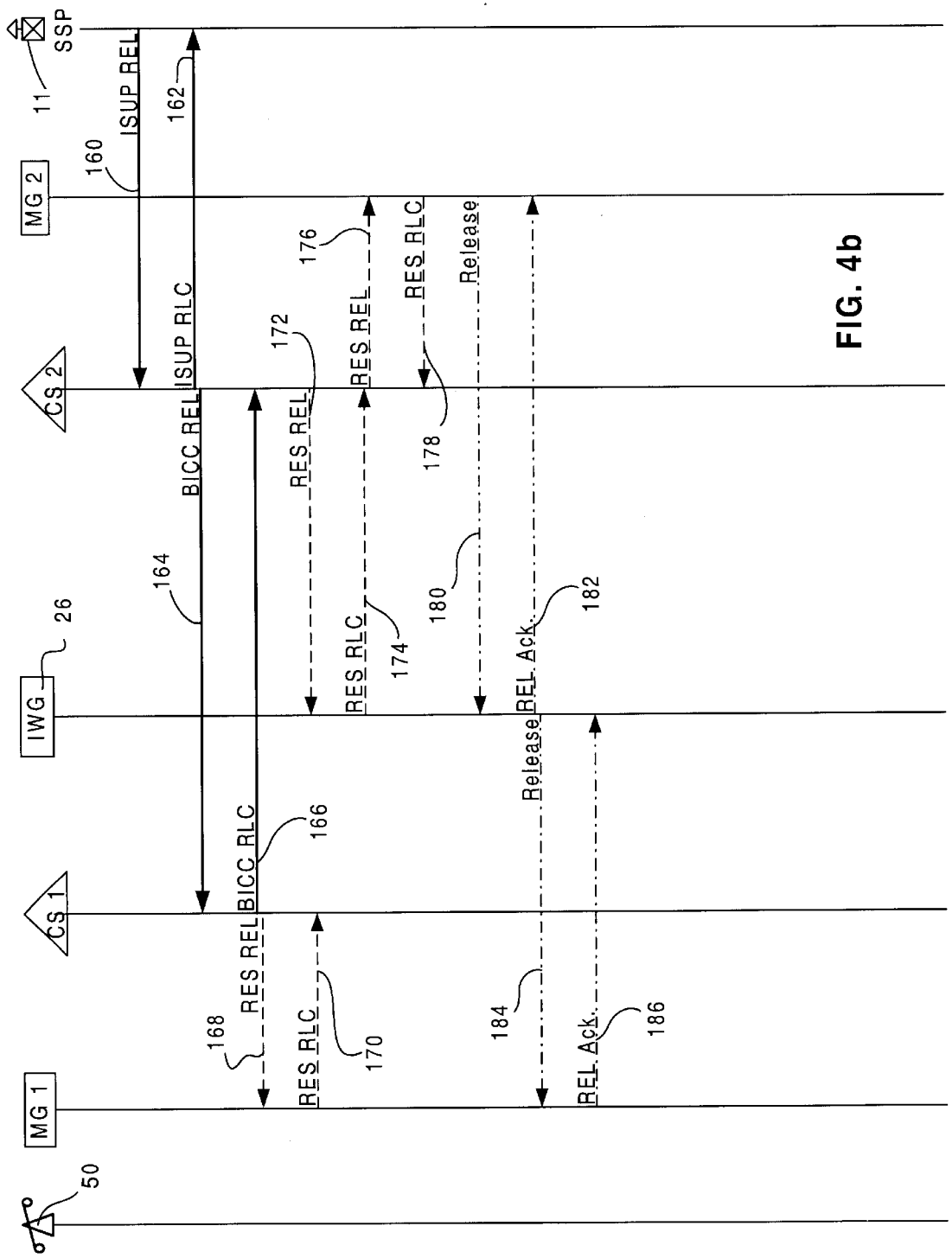
FIG. 4*b* is a continuation of the message flow diagram shown in FIG. 4*a*, showing principal messages exchanged during when the communications session is torn down in accordance with a preferred embodiment of the invention.

FIG. 4*a* is a call flow diagram that illustrates principal steps involved in the establishment of a communications session between MGs connected to different broadband transport networks. For the sake of illustration, the call is initiated from an IP telephony device connected to a line MG in the IP network, and the called party is served by an SSP 11 connected to the ATM network 12 by a trunk MG 18 (FIG. 2). In FIGS. 4*a*, 4*b*, H.248 control messages are represented by dashed arrows, while CCS network messages are represented by solid lines, and the dash-dot lines represent broadband network messages. For the purpose of this description, it is assumed that each broadband transport network consistently uses one method to carry voice within it, like G.711 over ATM AAL1 or G.726 over RTP/IP.

In step 100, the directory numbers dialed by the calling party 50 are collected as digits by the line Media Gateway (MG 1) that serves the calling party 50. The collected digits are relayed to a CS (CS 1) in step 102. The MG 1 reserves a user path for the call (step 104), while the CS 1 translates the dialed digits, and assigns a signaling correlation tag (SCT) to the call to identify the call within the IP network (step 106). The CS 1 (step 108) sends a Bearer Independent Call Control (BICC) Initial Address message (IAM) over the CCS network, to a CS (CS 2) in the ATM network 12 identified by the translation of the dialed digits in step 106. The BICC IAM contains the assigned SCT (SCT a), the IP network address of the MG 1, and the Bearer Type (BT), which identifies the transport protocol used by MG 1; in this case, Real-time Transfer Protocol over Internet Protocol (RTP/IP) with G.711 voice encoding. The CSI also sends an IAM Advisory message to the MG 1 to alert the MG 1 to a pending call identified by the SCT a (step 110). On receipt of the BICC IAM, the CS 2 performs two actions. First, the CS 2 determines the IWG 26 to be used (step 112) using the address sent in the BICC IAM (step 108). The CS 2 then sends an H.248 control message to the IWG 26 (step 114) that includes: the transport protocol of the MG 1, the IP address of the MG 1 which identifies the network address of MG 1, and the SCT a, assigned by CS 1. The IWG 26, upon receiving the control message, verifies that it has available resources, allocates an available port 30 associated with the transport protocol type (step 116), and, in step 118, sends an IP Connection Setup message to the MG 1. The Connection Setup message includes the IP address of the allocated IWG port, and the SCT a. The MG 1 returns an IP Connect message (step 120) to the IWG port 30 associated with the IP SCT. This completes the reservation of an RTP/IP path through the IP network (step 122).

Meanwhile, the CS 2, after sending the control message to the IWG 26 (step 114), proceeds to translate the dialed directory number (step 124), and determines that an MG (MG 2) serves as a gateway to the SSP 11 that serves the called party (not shown). The CS 2 assigns a SCT (SCT b) to identify the call in the ATM network. The CS 2 sends an IAM Advisory to the MG 2 (step 126, and a correlation message to the IWG (step 128). The IAM Advisory contains the ATM network address of the IWG 26, the ATM SCT (SCT b), and a directive to initiate a connection with the IWG 26. The correlation message alerts the IWG 26 to a pending connection between ports identified by the SCT a and the SCT b. MG 2, as directed, sends the IWG 26 an ATM Connection Setup message (step 130) containing the ATM address of the port it has allocated to the pending call, and the SCT b. The IWG 26 verifies its resources and assigns the call (identified by SCT b) to a port reserved when the correlation message was received in step 128. The IWG 26 then returns an ATM Connect message (step 132) to the allocated port of the MG 2 with the ATM SCT b included, and configures the switch 42 (FIG. 3) to route messages from the respective receive paths and transmit paths allocated to the call (step 134). In step 136, the MG 2 advises the CS 2 of the completed reservation of an ATM virtual trunk connection between the MG 2 and the IWG 26 by sending a Connection Acknowledgement message.

The CS 2 then formulates an ISUP IAM and sends it to the SSP 11 that serves the called party. Upon receipt of the ISUP IAM, the SSP translates the dialed number and applies ringing (not shown) to the subscriber line of the called party. The SSP 11 then returns an ISUP Address Complete message (ISUP ACM) to the CS 2 (step 140) via the CCS network. The SSP 11 then sets up a TDM path between the subscriber line and the MG 2 (step 142). The CS 2 receives the ISUP ACM and sends an ACM Advisory message through the ATM network 12 to MG 2 (step 144), which directs the MG 2 to connect the TDM path to the ATM SVC (step 146). The CS 2 also formulates a BICC ACM to CS 1 (step 148). The CS 2 issues an ACM Advisory message that is sent to MG 1 through the IP network (step 150), to initiate a cut-through of the user path (set up in step 104) to the RTP/IP path (set up in step 152).

When the call is answered (not shown), the SSP 11 formulates an ISUP ANM message that is sent to the CS 2 (step 154). The CS 2 relays the call status in a BICC ANM through the CCS network, to CS 1 (step 156). An end-to-end communications session is thus established and conversation between the two parties ensues. The PDUs that carry the telephony content are carried by the paths activated by respective connections to the IWG 26 and the PDUs are converted between RTP/IP packets and ATM Application Layer 1 cells at the IWG (step 158). If the voice encoding in the IP network was different than in the ATM network, the IWG in step 158 would also provide codec adaptation.

As conversion between PDUs of a plurality of transport protocols is desirable, it is efficient to use a base format as an intermediate format for converting between a receive and a transmit protocol. The base format is preferably a Pulse Code Modulated (PCM) format, which is used for standard telephone payload in the PSTN.

With the IWG connection established and the virtual trunk connections in place, the communication session between the calling and the called parties is enabled. The payload of this communications session is carried in streams of PDUs addressed to the assigned ports of the IWG 26. The data issuing from the calling party equipment goes to the IP port, and the stream of PDUs issuing from the called party equipment is relayed to the ATM port of the IWG 26. Each of the ports sequence the PDUs, if necessary, and the payload of the sequenced PDUs is extracted. The extraction may be followed by decoding, or applying some other algorithm to the payload data contained in the PDU. The payload is then converted to a form that can be adapted to conform to any of the transport protocols that the IWG is provisioned to convert.

As will be understood by those skilled in the art, the steps involved in conversion depend on the protocol being converted to the base format. Packets may contain compressed payload that has been compressed using one of many encoding formats like G.726 or G.729. In the embodiment of the invention described above, the base format is assumed to be G.711, also referred as PCM format. Consequently, the IP port of the IWG receives packets on the receive path, extracts the payload, and decodes the extracted payload, to obtain content which it converts to PCM data. On the transmit path of the IP port, PCM data is received from the switch 42 (FIG. 3) and encoded and packetized prior to transmission through the IP network. The ATM port of the IWG receives AAL 1 cells which are forwarded to the receive buffer, the headers and trailers of the ATM cells are discarded, and PCM data remains. Along the ATM port's transmit path, PCM data is received, inserted into properly addressed cells and transmitted through the ATM network.

Conversion is continuously performed throughout the communications session. When the communication session terminates, the IWG releases the resources allocated to the communications session, and releases the ports, as shown in FIG. 4b.

The communications session is terminated by the called party (not shown). In step 160, an ISUP Release (REL) message is formulated by the SSP in response to an on-hook signal from the called party line. The ISUP REL message is sent to CS 2. The ISUP REL message is acknowledged with an ISUP Release Complete (RLC) message (step 162), and a BICC REL message is formulated by the CS 2 and sent to CS 1 (step 164). The BICC REL message is similarly acknowledged in step 166 with a BICC RLC. In step 168, the CS 1 issues an IP Resource Release (RES REL) message * directing the MG 1 to take down the connection between the user signaling path and the RTP/IP path. The IP RES REL message is acknowledged with an IP RES RLC message in step 170. The CS 2 then issues an H.248 control message to the IWG (step 172) directing it to release resources associated with both SCT a and SCT b. The IWG takes down its switch connection between the ports associated with the two SCTs, releases the ports, and then returns an acknowledgement to the H.248 RES REL message with a H.248 RES RLC message (step 174). The CS 2, upon receipt of the H.248 RES RLC issues an ATM RES REL message to MG 2, directing MG 2 to release the cut-through and port resources associated with SCT b. The MG 2 acknowledges the ATM RES REL message with an ATM RES RLC message (step 178), and then issues a REL Advisory message to the IWG (step 180) to take down the SVC. In step 182, the ATM REL Advisory is acknowledged with an ATM REL Acknowledgement (REL Ack) message, indicating that the SVC is released. The last two steps (180, 182) will not be effected if, instead of tearing down the SVC, it is advantageous to cache the SVC for later purposes.

The embodiment(s) of the invention described above are intended to be exemplary only. The scope of the invention is therefore intended to be limited solely by the scope of the appended claims.

I claim:

1. An interworking gateway for providing conversion among members of a provisioned set of broadband transport networks, comprising:
   a) at least one receive path connected to each of the broadband transport networks, each receive path being adapted to receive protocol data units (PDUs) from a respective broadband transport network, extract a content of the PDUs, and convert the content to data in a base format;
   b) at least one transmit path connected to each of the broadband transport networks, each transmit path being adapted to receive a stream of base format data from one of the at least one receive paths, convert the base format data into PDUs of a respective broadband transport network, and send the PDUs into the respective broadband network;
   c) a switch for selectively connecting and disconnecting a one of the at least one receive paths to a one of the at least one transmit paths; and
   d) a controller for controlling the switch in response to connection setup messages received from the respective broadband transport networks.

2. An interworking gateway as claimed in claim 1, wherein the PDUs of the members of the provisioned set of broadband transport networks include: Real-time Transfer Protocol over Internet Protocol (RTP/IP) packets, Asynchronous Transfer Mode (ATM) Adaptation Layer 1 (AAL 1) cells, (ATM) Adaptation Layer 2 (AAL 2) cells and Frame Relay (FR) frames.

3. An interworking gateway as claimed in claim 1 wherein the base format is Pulse Code Modulated (PCM) data format.

4. An interworking gateway as claimed in claim 1, wherein each receive path comprises:
   a) a receive buffer adapted to temporarily store PDUs received from the broadband transport network of the receive path; and
   b) a receive format adapter enabled to extract content from the received PDUs, and convert the content into the base format.

5. An interworking gateway as claimed in claim 4 wherein the receive format adapter comprises:
   a) a decoder adapted to decode the payload data of the received PDUs, and pass the decoded payload data to a converter; and
   b) the converter is adapted to convert the payload data to base format.

6. An interworking gateway as claimed in claim 5, wherein the decoder of a Real-time Transfer Protocol over Internet Protocol (RTP/IP) format adapter is adapted to decode the extracted payload data of the PDUs using a selected one of G.711, G.729 or G.726encoding methods.

7. An interworking gateway as claimed in claim 1, wherein the controller is adapted to exchange control messages with Media Gateways of each of the respective broadband transport networks.

8. An interworking gateway as claimed in claim 7 wherein the control messages conform to an H.248 control messaging protocol.

9. An interworking gateway as claimed in claim 7 wherein the controller is adapted to perform messaging functions of a Media Gateway in each of the provisioned set of broadband transport networks.

10. An interworking gateway as claimed in claim 1, wherein each transmit path comprises:
    a) a transmit buffer adapted to temporarily store PDUs prior to transmission into the broadband transport network of the transmit path; and
    b) a transmit format adapter enabled to convert a stream of base format data into PDUs of the broadband transport network to which the transmit path is connected.

11. An interworking gateway as claimed in claim 10 wherein the transmit format adapter comprises:
    a) an encoder adapted to encode the stream of base format data, and
    b) a PDU generator for generating PDUs in a protocol of the broadband transport network to which the transmit path is connected, and for inserting the encoded data as payload into the PDUs.

12. An interworking gateway as claimed in claim 11, wherein the encoder of a Real-time Transfer Protocol over Internet Protocol (RTP/IP) is adapted to encode the data stream in the base format using a selected one of G.711, G.729, or G.726voice encoding methods.

13. A method of establishing a communications session through an interworking gateway that provides interworking among a provisioned set of broadband transport networks, said method comprising steps of:
    a) receiving from a Call Server (CS) connected to a first broadband transport network, a control message indicating a second broadband transport network, a first Signaling Correlation Tag (SCT) associated with the second broadband transport network, and a second SCT associated with the first broadband transport network;
    b) associating with the first SCT both a receive path and a transmit path connected to the first broadband transport network;
    c) associating with the second SCT both a receive path and a transmit path connected to the second broadband transport network;
    d) interconnecting the receive path associated with the second SCT with the transmit path associated with the first SCT; and
    e) interconnecting the receive path associated with the first SCT with the transmit path associated with the second SCT.

14. A method as claimed in claim 13 wherein the control message conform to H.248 control messaging protocol.

15. A method as claimed in claim 12 wherein the step of receiving the signaling message comprises steps of:
    a) receiving from the CS, an Initial Address Advisory message providing an identifier of the second broadband transport network, the network address of a first Media Gateway in the second broadband transport network, and the first SCT; and
    b) receiving from the CS a correlate message containing the first SCT and the second SCT.

16. A method as claimed in claim 15 further comprising a step of initiating a connection setup through the second broadband transport network in order to establish virtual trunk connection between the interworking gateway and the first media gateway.

17. A method as claimed in claim 15 further comprising steps of:
    a) receiving from the second media gateway a connection setup message containing the second SCT, as well as a network address of the second media gateway; and
    b) transmitting a connect message through the first broadband transport network to the second media gateway.

18. A method as claimed in claim 13 wherein protocol data units (PDUs) respectively transported by the set of broadband transport networks comprise at least one of: Real-time Transfer Protocol over Interact Protocol (RTP/IP) packets, Asynchronous Transfer Mode ATM Adaptation Layer 1 (AAL 1) cells, ATM Adaptation Layer 2 (AAL 2) cells and Frame Relay (FR) frames.

* * * * *